ELECTRONIC PULSE CORRECTION CIRCUIT

Filed July 28, 1961 3 Sheets-Sheet 1

*INVENTORS*
ROBERT V. BURNS
ROBERT T. CLEARY
*BY* C. A. Gulbrandsen
ATTY.

ELECTRONIC PULSE CORRECTION CIRCUIT

Filed July 28, 1961 3 Sheets-Sheet 2

INVENTORS
ROBERT V. BURNS
ROBERT T. CLEARY
BY C. A. Gulbrandsen
ATTY.

*INVENTORS*
ROBERT V. BURNS
ROBERT T. CLEARY
*BY* C. A. Gulbrandsen
ATTY.

United States Patent Office 3,092,691

Patented June 4, 1963

3,092,691
ELECTRONIC PULSE CORRECTION CIRCUIT

Robert V. Burns, Markham, and Robert T. Cleary, Lockport, Ill., assignors to Automatic Electric Laboratories, Inc., Northlake, Ill., a corporation of Delaware Filed July 28, 1961, Ser. No. 127,567
8 Claims. (Cl. 179—16)

This invention relates to a pulse correcting arrangement, and more particularly to an arrangement for correcting the pulse ratio, or duty cycle, of dialing impulses in an automatic telephone system.

In the past, pulse correctors have been used to improve the shape and pulse ratio of dial impulses. They all, however, have been suffering from a fundamental drawback; the output pulse waveform has not been maintaining a constant pulse ratio over a range of pulse ratios and frequencies of the input wave form.

The principal object of this invention is, therefore, the provision of an output waveform that maintains a constant pulse ratio over a range of pulse ratios and frequencies of the input waveform.

According to the invention, a pulse correcting arrangement is provided using two transistor-capacitor networks to provide two separate timers. These timers are started by the output of two separate differentiators. The first one is started by the beginning of an impulse on the input sequence and the second is started by the end of a timing interval of the first timer. A transistor-resistor network is used to shorten the timing interval of the second timer to make the length of this interval a function of the frequency of the input. This network is operative upon the beginning of a succeeding impulse of the input sequence. The output from the second timer is coupled by a transistor network to the succeeding telephone equipment. The output sequence of impulses have a desired duty cycle regardless of the duty cycle of the input sequence. Furthermore, the output waveform maintains the desired duty cycle over a range of frequencies of the impulses.

An additional advantage of the above arrangement is that the timers are non-interacting, and therefore costly precision circuit elements need not be used.

Another object of this invention is to provide an arrangement used in combination with the pulse correcting circuitry for repeating seizure and disconnect signals.

Previous pulse correctors have dialed the digit 1 when disconnect occurred. External circuitry then released the connection, which is highly undesirable since approximately one-half second is required to transmit the disconnect signal. If several of these circuits are in tandem, then several seconds are necessary before the entire connection is released and trunk guarding problems can exist.

According to a further feature of the invention, an off-hook supervision arrangement bypasses the pulse correcting timers. The seizure signal is transmitted to the output without being delayed by the first timer. The disconnect signal starts the pulse correcting arrangement as though it were the beginning of another dialling impulse, causing the output to return to its normal off-hook condition at the end of the first timing interval. If this is actually a disconnect, and not an impulse, the input remains off, and a timer in this arrangement assures that the output remains off.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–6 wherein.

Figure 1:
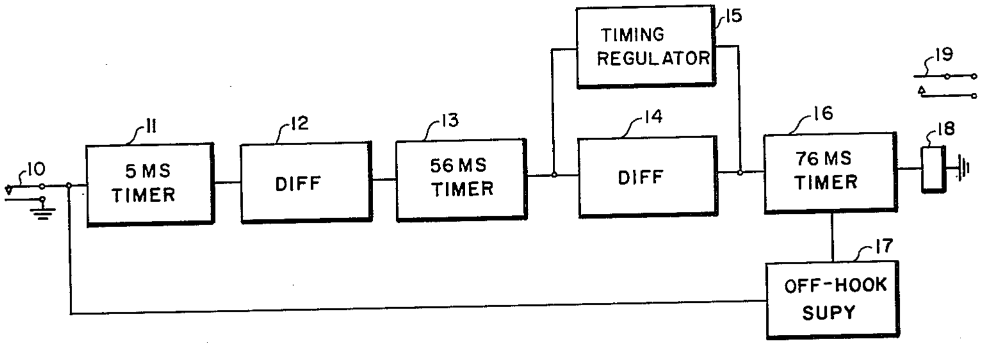
FIG. 1 is a block diagram of a pulse correcting arrangement.

Referring to FIG. 1, this pulse correcting arrangement comprises 5 millisecond timer 11 which is started by contact pair 10 in the preceding equipment. This timer produces a 5 millisecond delay to prevent short input noise pulses from spuriously operating the pulse corrector. At the end of the 5 millisecond interval, this timer supplies a pulse to differentiator 12, which is sensitive to the leading edge of an incoming impulse. As a result a differentiated pulse is supplied to 56 millisecond timer 13, when the leading edge of an input pulse is present. This timer causes the output to be delayed from the input by 56 milliseconds. At the end of this timing interval a pulse is supplied to differentiator 14. This differentiator is sensitive to the trailing edge only of the output pulse from 56 millisecond timer 13 and starts 76 millisecond timer 16.

The timing regulator 15 is connected to 76 millisecond timer 16 at the beginning of a subsequent 56 millisecond timing interval, which is generally before the end of the 76 millisecond timing interval. This timing regulator causes the 76 millisecond timing interval to be shortened in proportion to the speed of the input sequence of impulses. The 76 millisecond timer 16 causes relay 18 to produce output pulses by means of contact pair 19.

Upon seizure, off-hook supervisory unit 17 provides a bypass around the pulse correcting timers. Therefore when contact pair 10 is closed, relay 18 is immediately operated by means of off-hook supervisory unit 17. Upon receipt of the disconnect signal, off-hook supervisory unit 17 prevents 76 millisecond timer 16 from operating relay 18, providing a disconnect signal to the succeeding equipment.

Figure 2:
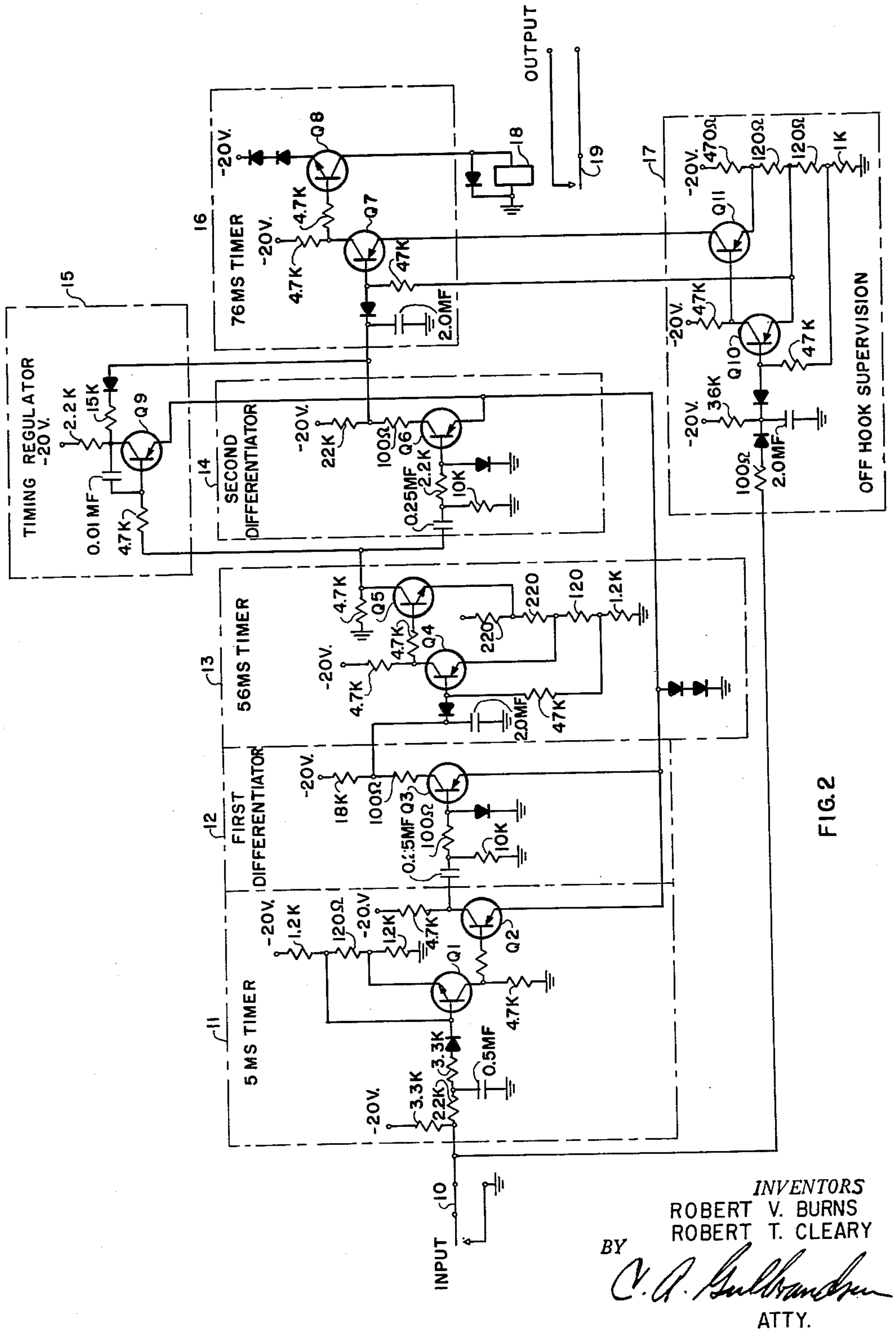
FIG. 2 is a schematic diagram of the pulse correcting arrangement.

Referring now to FIGURE 2, operation of contact pair 10 in the preceding telephone equipment brings transistor Q10 from saturation to non-conduction, causing transistor Q11 to saturate. As a result transistor Q11 allows transistor Q7 to become saturated. Transistor Q8 also becomes saturated due to the conduction of transistor Q7, which completes the circuit to relay 18. Upon operation of relay 18, contact pair 19 causes off-hook supervision to be repeated to the succeeding telephone equipment.

When the input contact pair 10 opens at the beginning of a dial impulse, the 0.5 mf. capacitor begins to charge. After approximately 5 milliseconds this capacitor has sufficient voltage across it to turn transistor Q1 off, producing a 5 millisecond delay in the operation of transistor Q1. Transistor Q1 then turns off transistor Q2. The collector circuit of transistor Q2 then causes a differentiating pulse to be present at the base of transistor Q3, turning transistor Q3 on momentarily. Transistor Q3 is on for a sufficiently long period of time to discharge the 2.0 mf. capacitor. After this period of time Q3 turns off. The discharging of the 2.0 mf. capacitor causes transistor Q4 to turn off. This capacitor then begins to charge through the 18K resistor. At the end of the 56 millisecond period, this capacitor has sufficient voltage across it to turn transistor Q4 on again, turning transistor Q5 on. When transistor Q5 turns on, its collector circuit causes a differentiated pulse to appear at the base of transistor Q6. The collector current in transistor Q6 causes the 2.0 mf. capacitor to discharge in a very short time, causing transistor Q7 to turn off. When transistor Q7 is turned off, transistor Q8 is turned off, causing relay 18 to release. The 2.0 mf. capacitor then begins to charge through the 22K resistor. If it were not for additional circuitry transistor Q7 would be turned on due to the voltage across the 2.0 mf. capacitor, 76 milliseconds after the discharge of this capacitor.

Since the pulse corrector gives the same pulse ratio at frequencies of 7½ to 15 pulses per second, the relay 18 is not released for 76 milliseconds at all speeds, only at 7½ pulses per second. The pulse ratio, or duty cycle, is defined as the ratio of the interval of time that a pair of contacts is closed to the interval of time that the contact pair is both open and closed. If the input frequency is higher than 7½ pulses per second, the 76 millisecond timing interval must be shortened. Transistor Q9 is used to adjust this interval. When transistor Q9 is off, the 15K resistor is placed in parallel with the 22K resistor, causing a smaller RC time constant to shorten the timing interval. Since transistor Q9 is under the control of Q5, transistor Q9 causes the interval to be shortened from the time that the input contact pair 10 is opened for the succeeding pulse until the next 56 millisecond timing period has elapsed. Thus if the frequency is higher the next pulse comes sooner and the transistor Q9 causes the total time to be reduced further.

Figure 3:
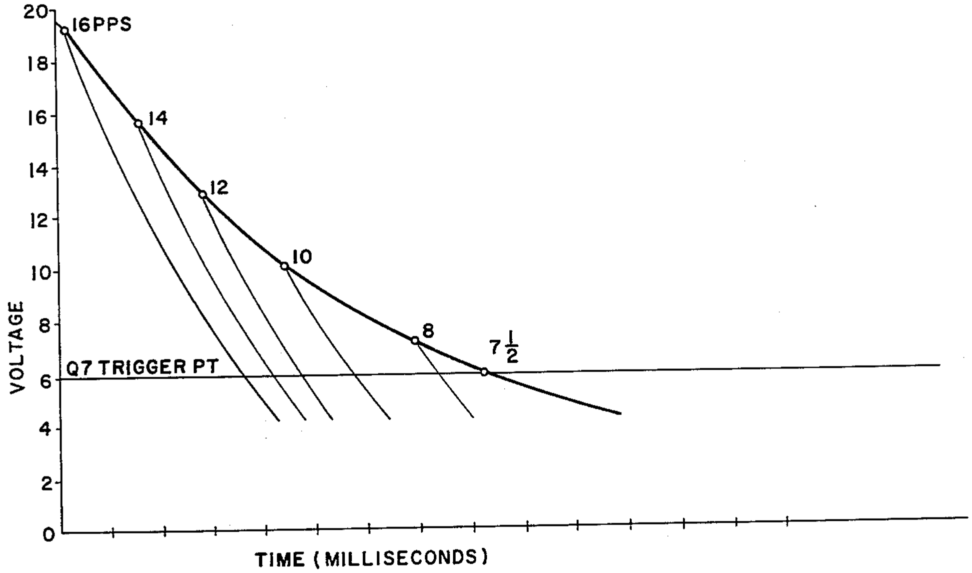
FIG. 3 is a graph that illustrates how the second timing interval is shortened.

This change in the RC time constant at different points in time depending upon the frequency of the input is illustrated by the graph in FIG. 3. Six different discharge paths are shown for six different frequencies of the incoming impulses. The graph clearly indicates that transistor Q9 never goes off during the 76 millisecond interval of transistor Q8 for an input frequency of 7½ pulses per second. Therefore by changing the time constant at different times, a constant pulse ratio is maintained over the range of frequencies from 15 to 7½ pulses per second.

Figure 4:
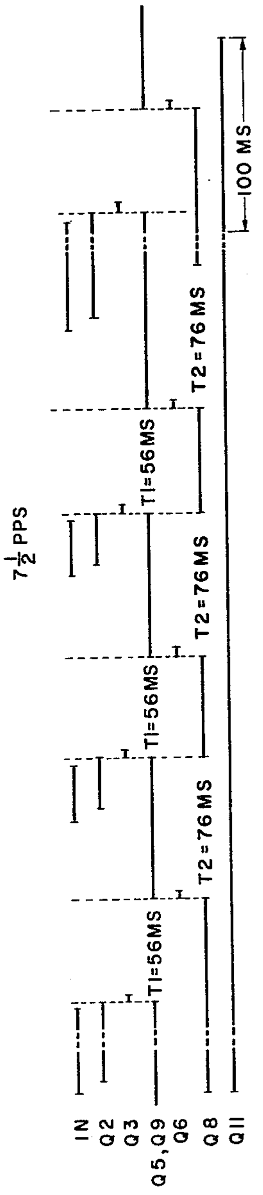
FIGS. 4–6 are timing diagrams to indicate the operation of the various transistors in the arrangement.
Figure 5:
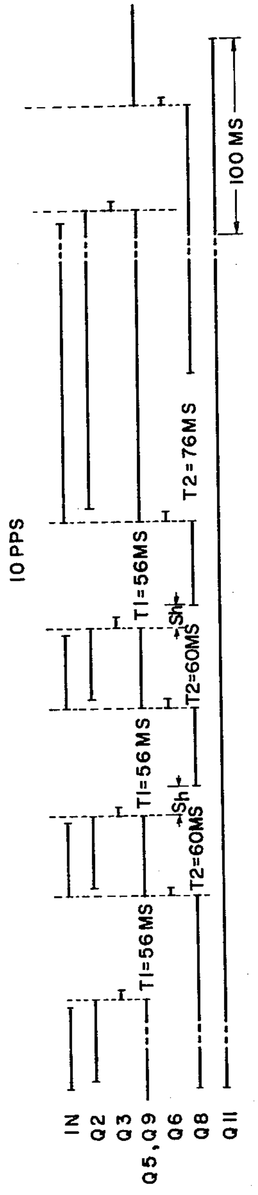
Figure 6:
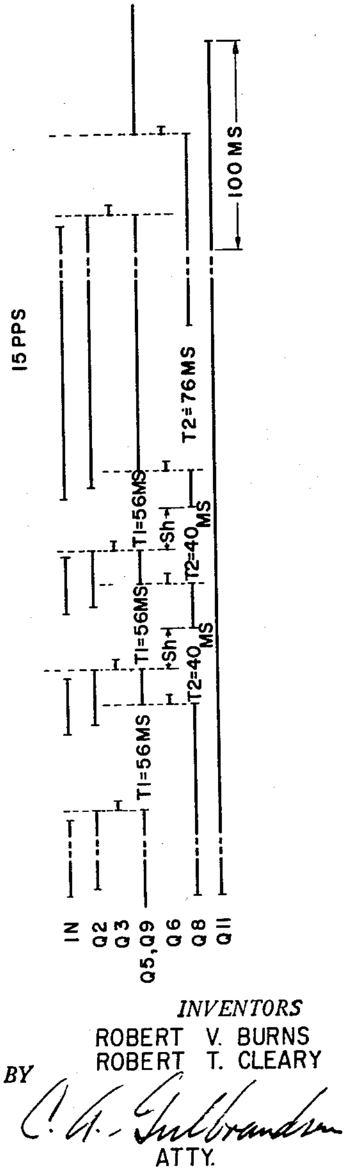

FIGS. 4–6 indicate the timing sequence for three different input frequencies by showing when the various transistors are on, presence of a line, and off, absence of a line. The first timing interval T1 starts at the beginning of an incoming impulse, delayed by 5 milliseconds. Furthermore, second interval T2 is started at the completion of interval T1. The shunt is connected by transistor Q9 at the beginning of a succeeding impulse delayed by 5 milliseconds effectively to shorten the interval T2. The 7½ pulses per second condition indicates that T2 is not affected by the shunt. For all three conditions the duty cycle of the output Q8, is always the same regardless of the duty cycle or frequency of the input impulses.

If the input circuit opens and does not reclose as in the case of a disconnect, the circuit operation is described as above except that due to the 2.0 mf. capacitor transistor Q11 is turned off 100 milliseconds after the input circuit opened. Therefore transistor Q7 is not turned on and the relay 18 does not reoperate, providing disconnect supervision to the succeeding telephone equipment.

The transistors utilized in this embodiment of the arrangement were type 2N404 for the PNP transistors and type 2N1605 for the NPN transistors.

While we have described above the principles of our invention in connection with specific apparatus, it is to be clearly understood that this description is made only by way of example and not as a limitation to the scope of our invention.

What is claimed is:

1. A pulse correcting arrangement for repeating a sequence of impulses with the output sequence of impulses having a desired duty cycle regardless of the duty cycle of the input sequence and regardless of the speed of the sequence, said arrangement comprising:
   - a first timing means for producing a first timing interval,

- a second timing means for producing a second timing interval,
   - means for starting the first timing means in response to the beginning of an impulse in the input sequence,
   - means for starting the second timing means in response to the output of the first timing means at the end of the first timing interval,
   - a device and means for effectively connecting the device to the second timing means in response to the output of the first timing means at the beginning of the first timing interval to shorten the length of the second timing interval as a function of the time between said beginning of the first said impulse and said beginning of said succeeding impulses,
   - and means for producing output pulses equal in duration to the output of the second timing means in response to the output of the second timing means.

2. An arrangement as claimed in claim 1, wherein said first timing means and said second timing means each includes a resistance-capacitance timing network with a corresponding time constant, and wherein said device comprises means for changing the time constant of the second timing means.

3. An arrangement as claimed in claim 2, wherein said means for starting the first timing means is a first differentiating circuit and said means for starting the second timing means is a second differentiating circuit.

4. An arrangement as claimed in claim 3, wherein said device comprises a resistor and said means for connecting said resistor comprises switching means which responds to the output of said second differentiating circuit to connect the resistor in said network of the second timing means.

5. An arrangement as claimed in claim 4, wherein said means for connecting said device comprises a diode in series with the device and a transistor switch to couple the diode in the device to the second timing means in response to the output of the first timing means at the beginning of the first timing interval, and wherein each said differentiating circuit includes a transistor with a capacitor in series with the input to the differentiating circuit to couple these input signals to the transistor.

6. An arrangement as claimed in claim 3, further comprising a third timer which includes a resistance-capacitance timing network with a given time constant to prevent spurious operation of said arrangement by short input noise impulses; and wherein the output of the third timer is coupled to the first differentiating circuit and the input to the third timer is coupled to said sequence of impulses.

7. In combination with the arrangement as claimed in claim 1, supervisory apparatus which bypasses said pulse correcting arrangement to repeat seizure signals, and which includes means responsive to an interruption of the input of a given duration greater than the maximum duration of an impulse for maintaining the output off independently of the second timing means.

8. The combination as claimed in claim 7, wherein said supervisory means comprises a transistor switch and a timing means, wherein the output of said timing means is coupled to said transistor switch.

References Cited in the file of this patent

UNITED STATES PATENTS

| | | |
|---|---|---|
| 2,409,105 | Christian | Oct. 8, 1946 |
| 2,420,713 | McCreary | May 20, 1947 |
| 2,495,725 | Horwitz | Jan. 31, 1950 |
| 2,717,278 | Blackhall et al. | Sept. 6, 1955 |
| 2,823,267 | Meacham | Feb. 11, 1958 |
| 2,830,128 | Radcliff et al. | Apr. 8, 1958 |